United States Patent
Liu et al.

(10) Patent No.: US 10,701,364 B2
(45) Date of Patent: Jun. 30, 2020

(54) GOLDEN-FRAME GROUP STRUCTURE DESIGN USING STILLNESS DETECTION

(71) Applicant: GOOGLE LLC, Mountain View, CA (US)

(72) Inventors: Yuxin Liu, Palo Alto, CA (US); Di Chen, West LaFayette, IN (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 142 days.

(21) Appl. No.: 15/794,134

(22) Filed: Oct. 26, 2017

(65) Prior Publication Data

US 2019/0132592 A1 May 2, 2019

(51) Int. Cl.
*H04N 19/139* (2014.01)
*H04N 19/172* (2014.01)
(Continued)

(52) U.S. Cl.
CPC ......... *H04N 19/139* (2014.11); *H04N 19/107* (2014.11); *H04N 19/109* (2014.11);
(Continued)

(58) Field of Classification Search
CPC .. C11D 3/386; C11D 3/38681; H04N 19/107; H04N 19/139; H04N 19/172; H04N 19/30
See application file for complete search history.

(56) References Cited

U.S. PATENT DOCUMENTS 6,950,465 B1  9/2005  Yokoyama et al.
8,879,635 B2 * 11/2014 Raveendran ........... H04N 5/144
                                                        375/240.24
(Continued)

FOREIGN PATENT DOCUMENTS

JP  2013034152   *  2/2013
JP  2013034152 A    2/2013

OTHER PUBLICATIONS

Bankoski, et al., "Technical Overview of VP8, An Open Source Video Codec for the Web", Jul. 11, 2011, 6 pp.
(Continued)

*Primary Examiner* — Md N Haque
(74) *Attorney, Agent, or Firm* — Young Basile Hanlon & MacFarlane, P.C.

(57) ABSTRACT

Encoding a group of frames of a video sequence can include determining a stillness of the group of frames, in response to determining that the stillness of the group of frames meets stillness conditions, encoding the group of frames using a coding structure that is a one-layer coding structure, and, in response to determining that the stillness of the group of frames does not meet the stillness conditions, encoding the group of frames using the coding structure that is a multi-layer coding structure. Instructions for decoding a group of frames include instructions to determine, from an encoded bitstream, an indication of a coding structure used to encode the group of frames, receive the group of frames in a coding order of the coding structure, and decode the group of frames using the coding structure. The indication is one of a one-layer coding structure indication or a multi-layer coding structure indication.

19 Claims, 9 Drawing Sheets

(51) Int. Cl.
  *H04N 19/107* (2014.01)
  *H04N 19/31* (2014.01)
  *H04N 19/177* (2014.01)
  *H04N 19/109* (2014.01)
  *H04N 19/30* (2014.01)

(52) U.S. Cl.
  CPC ......... *H04N 19/172* (2014.11); *H04N 19/177* (2014.11); *H04N 19/31* (2014.11); *H04N 19/30* (2014.11)

(56) References Cited

U.S. PATENT DOCUMENTS

| | | | |
|---|---|---|---|
| 9,578,342 B2* | 2/2017 | Yang | H04N 19/147 |
| 2008/0037869 A1 | 2/2008 | Zhou | |
| 2009/0154559 A1* | 6/2009 | Gardner | H04N 21/2381 375/240.14 |
| 2009/0226105 A1* | 9/2009 | Huang | H04N 19/139 382/236 |
| 2012/0287987 A1* | 11/2012 | Budagavi | H04N 19/105 375/240.02 |
| 2013/0308856 A1* | 11/2013 | Carpenter | G06K 9/00335 382/164 |
| 2014/0161198 A1* | 6/2014 | Tan | H04N 19/895 375/240.27 |
| 2016/0241866 A1* | 8/2016 | Kang | H04N 19/30 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

GOLDEN-FRAME GROUP STRUCTURE DESIGN USING STILLNESS DETECTION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

This disclosure relates generally to encoding and decoding video data and more particularly relates to multi-layer-multi-reference prediction using adaptive temporal filtering for encoding and decoding blocks of video frames.

A method for encoding a group of frames of a video sequence according to one implementation of the disclosure comprises determining a stillness of the group of frames, in response to determining that the stillness of the group of frames meets stillness conditions, encoding the group of frames using a coding structure that is a one-layer coding structure, and, in response to determining that the stillness of the group of frames does not meet the stillness conditions, encoding the group of frames using the coding structure that is a multi-layer coding structure.

An apparatus for encoding a group of frames of a video sequence according to one implementation of the disclosure comprises a memory and a processor. The memory includes instructions executable by the processor to determine a stillness of the group of frames, in response to the stillness of the group of frames meets stillness conditions, encode the group of frames using a one-layer coding structure, and, in response to the stillness of the group of frames does not meet the stillness conditions, encode the group of frames using a multi-layer coding structure.

An apparatus for decoding a group of frames of a video sequence according to another implementation of the disclosure comprises a memory and a processor. The memory includes instructions executable by the processor to determine, from an encoded bitstream, an indication of a coding structure used by an encoder to encode the group of frames, receive, in the encoded bitstream, the group of frames in a coding order of the coding structure, and decode the group of frames using the coding structure. The indication is one of a one-layer coding structure indication or a multi-layer coding structure indication.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
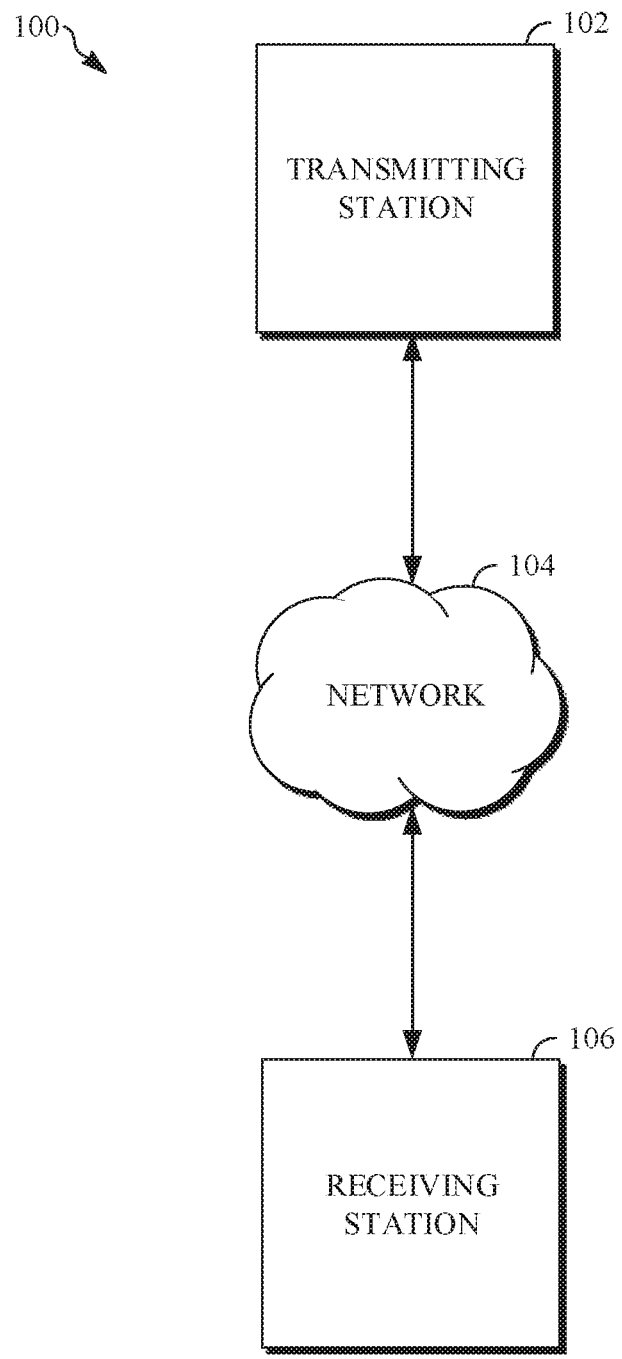
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of video using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signalled by an encoder to a decoder.

Encoding using temporal similarities can be known as inter prediction. Inter prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before or after the current frame in the sequence of the video stream. Some codecs use up to eight reference frames, which can be stored in a frame buffer. The motion vector can refer to (i.e., use) one of the reference frames of the frame buffer. As such, one or more reference frames can be available for coding a current frame.

In an example, three reference frames may be available to encode or decode blocks of other frames of the video sequence. The first reference frame may be an intra-predicted frame referred to as a key frame. The key frame may be referred to as the GOLDEN frame. The second reference frame may be a most recently encoded or decoded frame. The most recently encoded or decoded frame may be referred to as the LAST frame. The third reference frame may be an alternative reference frame that is encoded or decoded before most other frames, but which is displayed after most frames in an output bitstream. The alternative reference frame may be referred to as the ALTREF frame. The efficacy of a reference frame when used to encode or decode a block can be measured based on the resulting signal-to-noise ratio.

Two predictor blocks can be combined to form a compound predictor for a block or region of a video image. A compound predictor can be created by combining two or more predictors determined using, for example, the aforementioned prediction methods (i.e., inter and/or intra prediction). For example, a compound predictor can be a combination of a first predictor and a second predictor which can be two intra predictors (i.e., intra+intra), an intra predictor and an inter predictor (i.e., intra+inter) or two inter predictors (i.e., inter+inter). For example, in the case of inter+inter, compound inter prediction can employ a first motion vector to obtain a predictor from a first reference frame, and a second motion vector to obtain a predictor from a second reference frame. The reference frames can both be in the past, both in the future, or some combination thereof. The second motion vector can be independent of, or derived from, the first motion vector. As another example, and in the case of intra–inter, compound prediction can employ a first predictor generated by an intra prediction operation and a second predictor generated by an inter prediction operation.

In forming the compound predictor, an encoder can perform averaging, a weighted combination, a filtering operation, or a more complex form of estimating the significance of the value of each predictor, e.g., on a per-pixel basis to generate pixel values for the combined predictor using pixels of the two individual predictors. Accordingly, combining predictors can result in a compound predictor that can be an average of the two values or a weighted average that estimates the significance of the value of each predictor, for example.

A motion vector can be selected from a reference motion vector list of candidate reference motion vectors. The candidate reference motion vectors can include motion vectors from any previously coded (or decoded) blocks in the video stream, such as a block from a previously coded (or decoded) frame, or a block from the same frame that has been previously encoded (or decoded). The candidate reference motion vectors can be obtained from a co-located block (of the current block) and its surrounding blocks in a reference frame. For example, the surrounding blocks can include a block to the right, bottom-left, bottom-right of, or below the co-located block. In the case of non-compound inter prediction (i.e., single inter prediction), the candidate reference motion vectors for a block can include, for at least some reference frames, a single predictor motion vector per reference frame that can be the best motion vector for that reference frame. In the case of compound inter prediction, pairs of reference frames can be evaluated to determine a best motion vector(s) per pair of reference frames. The best motion vector(s) per pair can be included in a reference motion vector list.

In either case (i.e., intra, inter, or compound prediction), a prediction block is generated and can be subtracted from the block to be encoded to form the residual block representing the difference between the blocks.

A codec may partition (e.g., group) a video sequence into groups of pictures. The terms group of pictures, group of frames, and golden-frame group (GF group) are used interchangeably herein. A golden-frame group is a successive group of frames of the video sequence. The golden-frame groups are non-overlapping groups of frames. For example, a video sequence having 150 frames may be partitioned into 10 GF groups each containing 15 frames, 15 GF groups each containing 10 frames, or some other division.

The golden-frame groups of the video sequence need not have the same number of frames. The number of frames of a GF group is referred to as the length of the GF group. For example, a video sequence can be partitioned into GF groups where a GF group can have a length between 4 and 16 frames.

The number of frames forming each group of frames can vary according to the video spatial/temporal characteristics and other encoded configurations, such as the key frame interval selected for random access or error resilience, for example. The number of frames forming each group may be determined by a first pass of a two-pass encoder, such as the encoder 400 of FIG. 4. In the first pass, statistics regarding the frames to be encoded are gathered and used for further processing in the second pass. The statistics can include the level of motion across frames of the video sequence, the frame rate, the frame resolution, etc. For example, the less motion across a sequence, the larger the number of frames within a group of frames may exist.

In some examples, each frame of a GF group can be predicted using a prediction type. For example, one frame can be intra-predicted and another frame can be inter-predicted. As such, all blocks of a frame can use the same coding type. In another example, different blocks within the same frame can use different prediction types. For example, one block of a frame can use inter-prediction and another block of the same frame can use intra-prediction.

As mentioned above, a GF group is a group of successive frames of a video sequence. That is, regardless of the coding order of the frames of the GF group, the first frame of the GF group is displayed first, the second frame of the GF group is displayed next, and so on.

The frames of a GF group can be encoded using a coding structure. A coding structure, as used herein, refers to the order of coding of the frames of the GF group and/or which reference frames are available for coding the frames. A multi-layer coding structure and a one-layer coding structure are described below with respect to FIGS. 8A-8B, respectively. When referring to an encoder, coding means encoding; and when referring to a decoder, coding means decoding.

The frames of a GF group may be coded independently of the frames of other GF groups. In the general case, the first frame of the GF group is coded using intra prediction and all other frames of the GF group are coded using frames of the GF group as reference frames. In some cases, the first frame of the GF group can be coded using frames of a previous GF group. In some cases, the last frame of the GF group can be coded using frames of a previous GF group. In some cases, the first and the last frame of a GF group may be coded using frames of prior GF groups.

Stillness refers to the amount of motion or variation across the frames of the GF group. For example, in a video conferencing application most of the frames may be comprised of a fixed background and a relatively stationary speaker. In another example, most of the frames may be comprised of a fixed background and, every few seconds, a person enters the scene. Where a video is typically displayed at a rate of 30 frames per second, many groups of frames, in such applications, can exhibit a high level of stillness (i.e., very little movement or motion). In such examples, the level of stillness may be high and some GF groups can include at least some frames that may be completely still (i.e., no motion). On the other hand, in a video sequence of a sports event where the camera follows fast-moving athletes, the level of stillness may be very low.

The performance of a coding structure can depend on the level of stillness in the GF group being encoded using the coding structure. The performance of a coding structure refers to the efficacy of the compression (i.e., level of compression) using the coding structure. For example, whereas a multi-layer coding structure may generally result in good compression performance, when stillness is present in a GF group, a multi-layer coding structure may result in worse coding performance than a one-layer coding structure. Stillness may be determined to be present when the stillness of a GF group meets certain stillness conditions.

Implementations of this disclosure include determining a coding structure of a GF group based on a stillness measure of the GF group. A metrics-based stillness detection scheme is described. Three metrics for determining stillness are described. However, other metrics can be used. The metrics described are 1) the number of zero-motion blocks in the GF group, 2) the average per-pixel error in the GF group, and 3) the average raw standard deviation of the zero-motion blocks. Coding gains (i.e., improved compression performance) can result when a one-layer coding structure is used to encode the frames of a GF group that is still. For example, a coding gain of 1% was observed in two test cases that included GF groups that were determined to be still. A GF group is determined to be still if stillness metrics of the GF group meet stillness conditions.

Further details of golden-frame group structure design using stillness detection are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
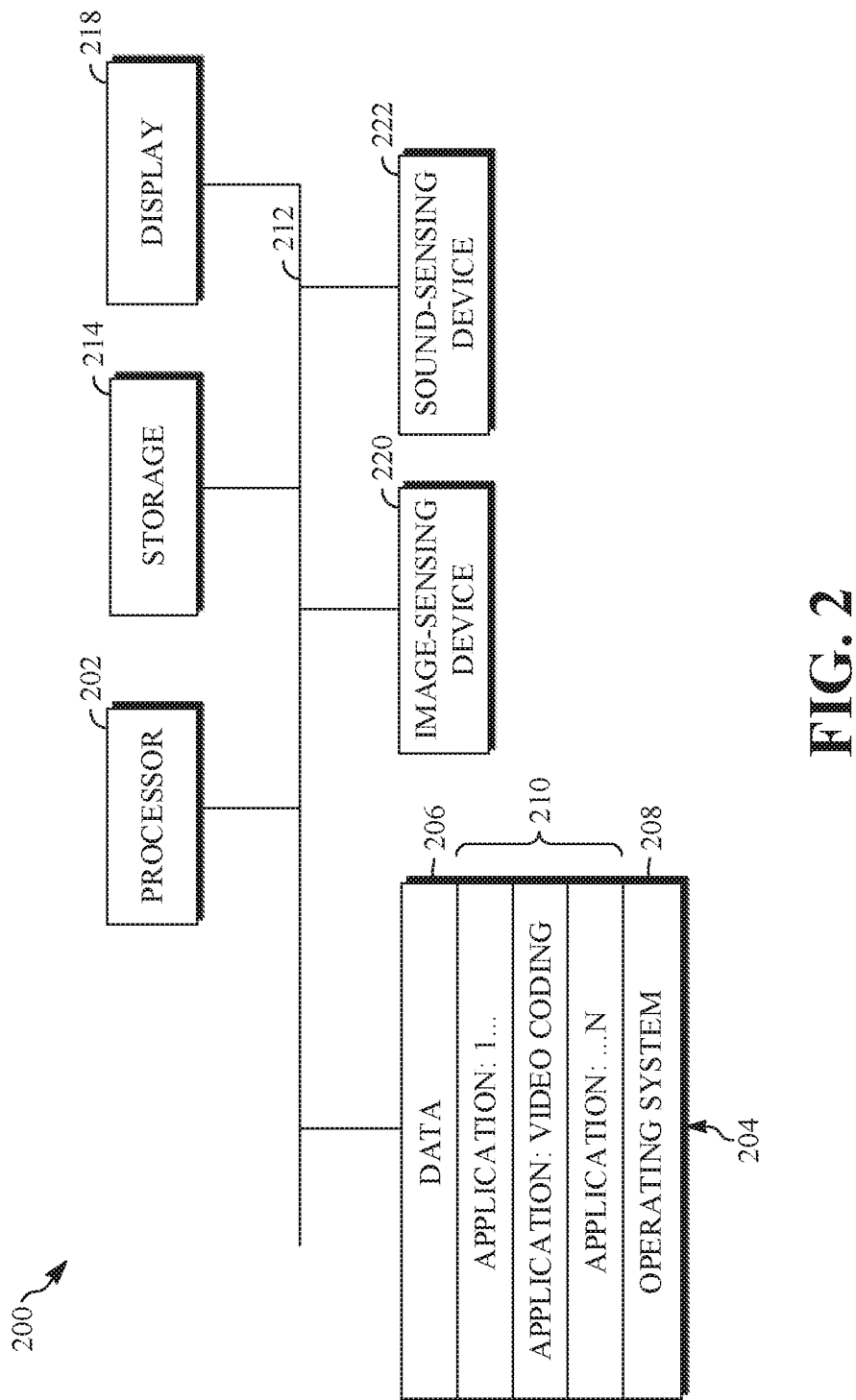
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
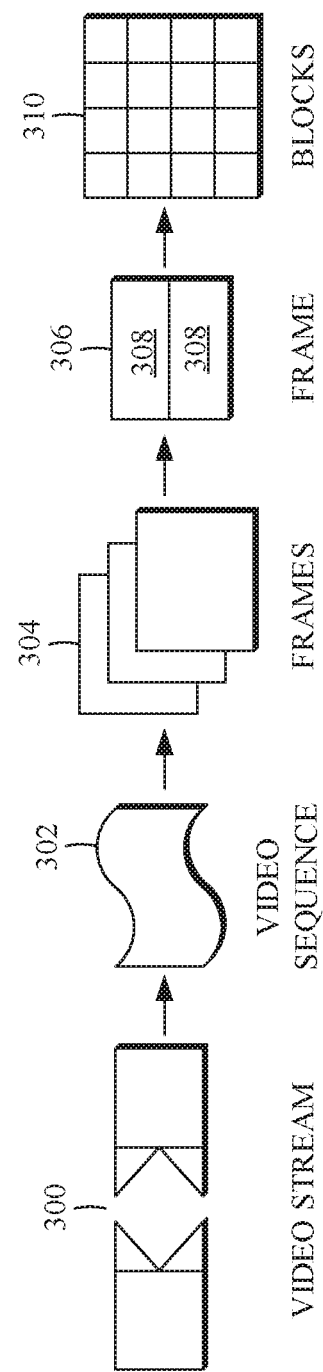
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
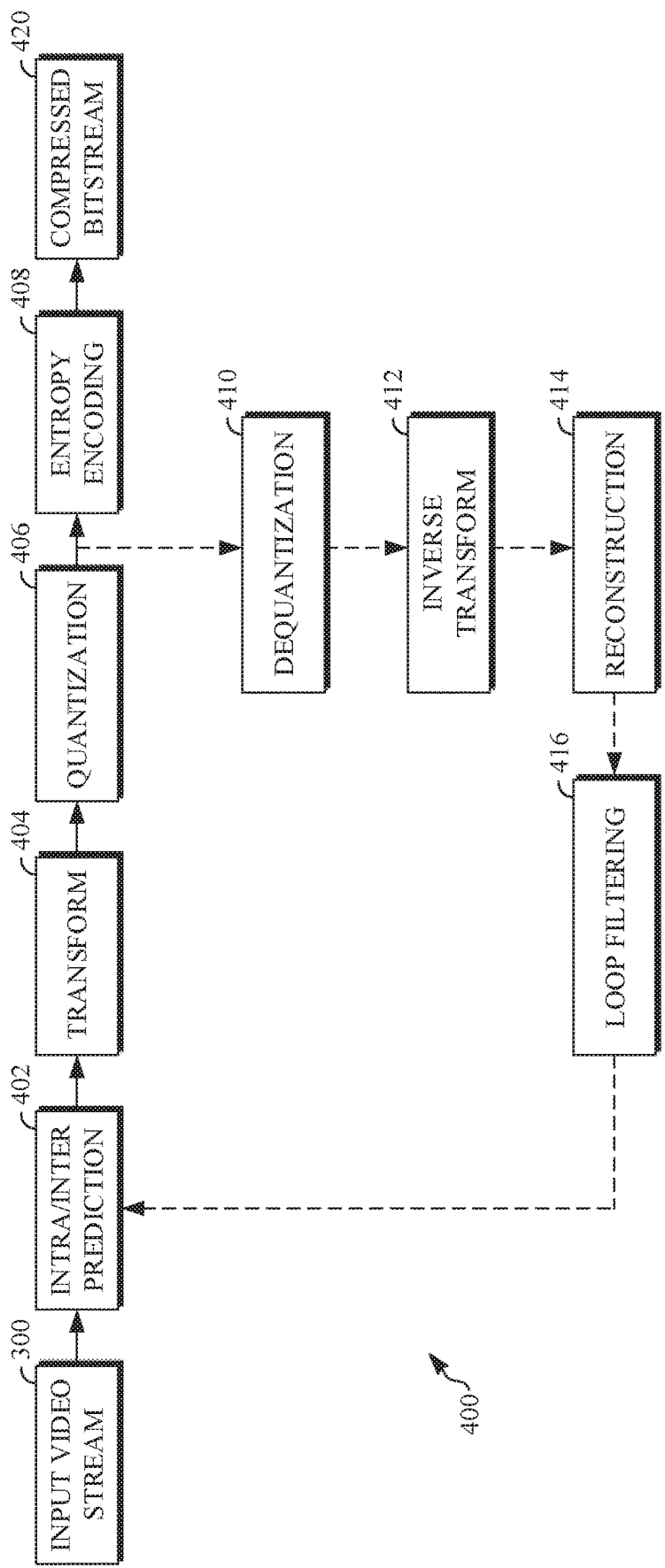
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using warped motion compensation to project pixels of a current block to a warped patch of a reference frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
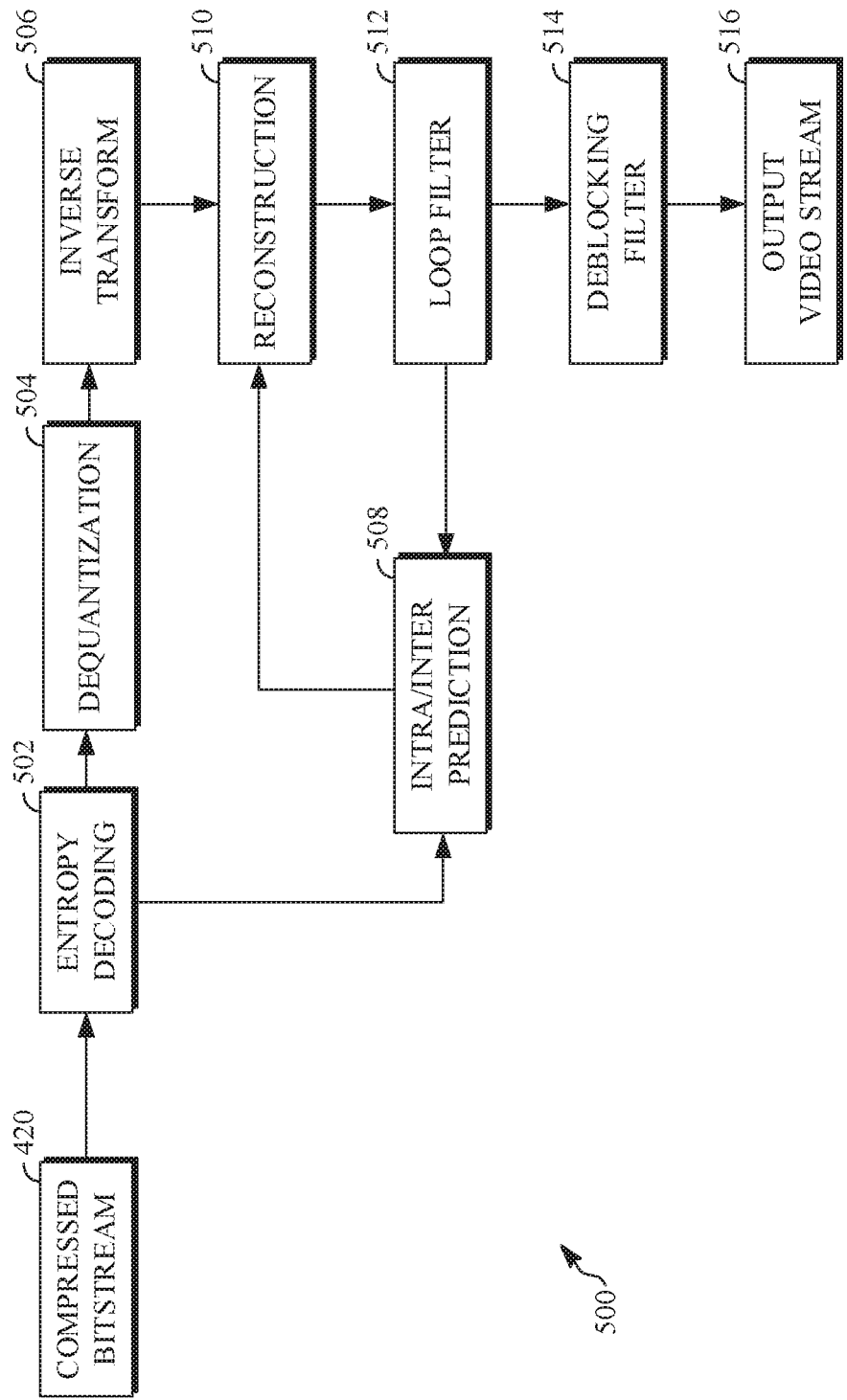
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoded 400 are discussed below with respect to FIGS. 6, 7, and 8, for example, using warped motion compensation to project pixels of a current block to a warped patch of a reference frame. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
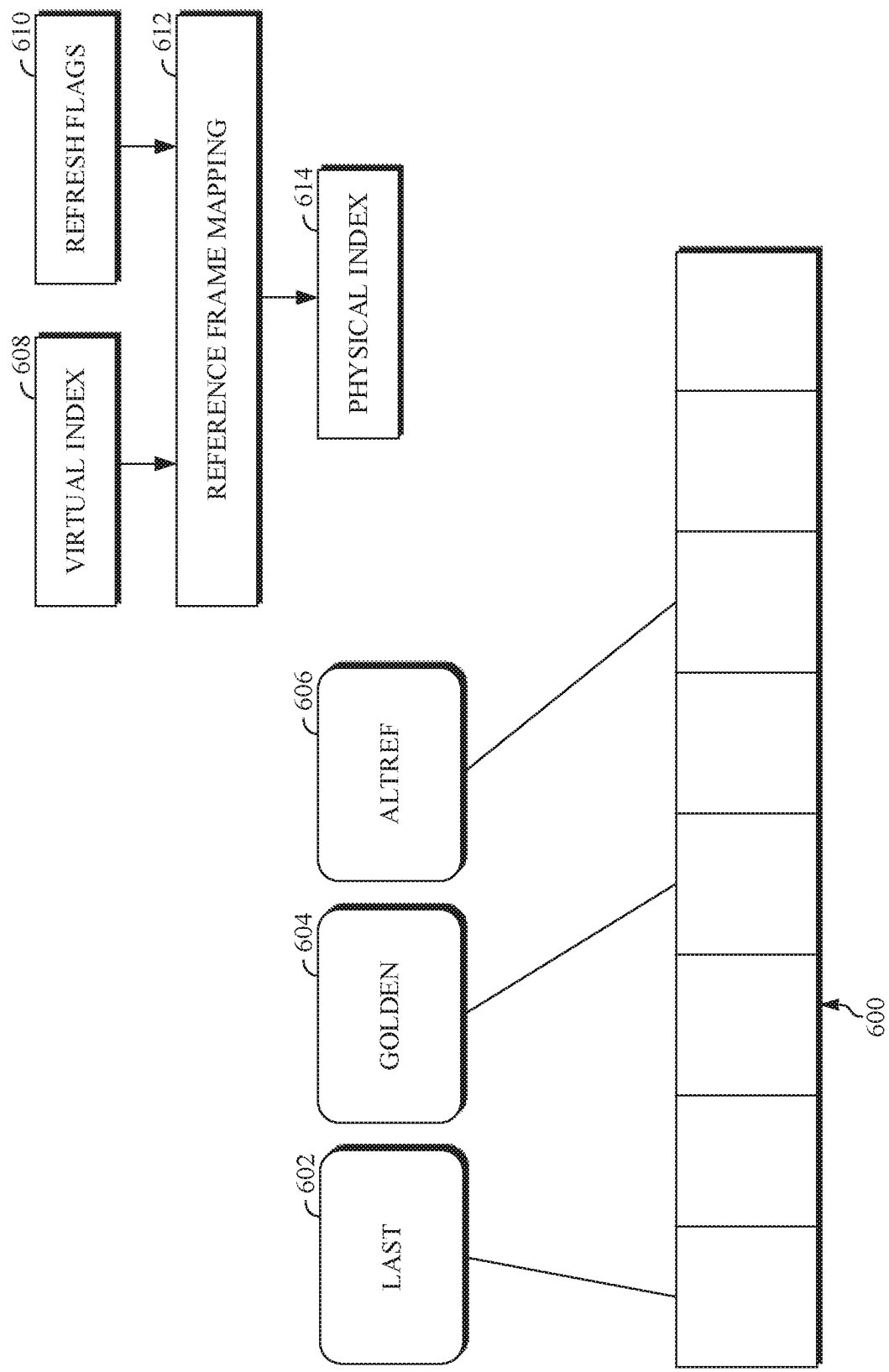
FIG. 6 is a block diagram of an example of a reference frame buffer according to implementations of this disclosure.

FIG. 6 is a block diagram of an example of a reference frame buffer 600 according to implementations of this disclosure. The reference frame buffer 600 stores reference frames used to encode or decode blocks of frames of a video sequence. The reference frame buffer 600 includes a last frame LAST 602, a golden frame GOLDEN 604, and an alternative reference frame ALTREF 606. The frame header of a reference frame can include a virtual index 608 to a location within the reference frame buffer 600 at which the reference frame is stored. A reference frame mapping 612 can map the virtual index 608 of a reference frame to a physical index 614 of memory at which the reference frame is stored. Where two reference frames are the same frame, those reference frames can have the same physical index even if they have different virtual indexes. One or more refresh flags 610 can be used to remove one or more of the stored reference frames from the reference frame buffer 600, for example, to clear space in the reference frame buffer 600 for new reference frames, where there are no further blocks to encode or decode using the stored reference frames, or where a new golden frame is encoded or decoded.

The reference frames stored in the reference frame buffer 600 can be used to identify motion vectors for predicting blocks of frames to be encoded or decoded. Different reference frames may be used depending on the type of prediction used to predict a current block of a current frame. For example, in an inter-inter compound prediction, blocks of the current frame can be forward predicted using any combination of the last frame LAST 602, the golden frame GOLDEN 604, and the alternative reference frame ALTREF 606.

There may be a finite number of reference frames that can be stored within the reference frame buffer 600. As shown in FIG. 6, the reference frame buffer 600 can store up to eight reference frames. Each of the stored reference frames can be associated with a respective virtual index 608 of the reference frame buffer. Although three of the eight spaces in the reference frame buffer 600 are used by the last frame LAST 602, the golden frame GOLDEN 604, and the alternative reference frame ALTREF 606, five spaces remain available to store other reference frames.

In particular, one or more available spaces in the reference frame buffer 600 may be used to store additional alternative reference frames (e.g., ALTREF1, ALTREF2, EXTRA ALTREF, etc., wherein the original alternative reference frame ALTREF 606 could be referred to as ALTREF0). The alternative reference frame ALTREF 606 is a frame of a video sequence that is distant from a current frame in a display order, but is encoded or decoded earlier than it is displayed. For example, the alternative reference frame ALTREF 606 may be ten, twelve, or more (or fewer) frames after the current frame in a display order.

However, the additional alternative reference frames can be frames located nearer to the current frame in the display order. For example, a first additional alternative reference frame, ALTREF2, can be five or six frames after the current frame in the display order, whereas a second additional alternative reference frame, ALTREF3, can be three or four frames after the current frame in the display order. Being closer to the current frame in display order increases the likelihood of the features of a reference frame being more similar to those of the current frame. As such, one of the additional alternative reference frames can be stored in the reference frame buffer 600 as additional options usable for backward prediction.

Although the reference frame buffer 600 is shown as being able to store up to eight reference frames, other implementations of the reference frame buffer 600 may be able to store additional or fewer reference frames. Furthermore, the available spaces in the reference frame buffer 600 may be used to store frames other than additional alternative reference frames. For example, the available spaces may store a second last frame LAST2 and/or a third last frame LAST3 as additional forward prediction reference frames. In another example, a backward frame BWDREF may be stored as an additional backward prediction reference frame.

As mentioned above, the frames of a GF group may be coded in a coding order that is different from the display order of the frames. For example, an encoder may receive the frames in the display order, determine a coding order (or a coding structure), and encode the group of frames accordingly. For example, a decoder may receive the frames (e.g., in an encoded bitstream) in the coding order, decode the frames in the coding order, and display the frames in the display order. As frames are coded (i.e., encoded by an encoder or decoded by a decoder), they may be added to the reference frame buffer 600 and assigned different roles (e.g., LAST, GOLDEN, ALTREF, LAST2, LAST3, BWDREF, etc.) for the coding of a subsequent frame. That is, frames that are coded first may be stored in the reference frame buffer 600 and used as reference frames for the coding (using inter-prediction) of other frames. For example, the first frame of a GF group may be coded first and assigned as a GOLDEN frame, and the last frame within a GF group may be coded second, assigned as an alternative reference (i.e., ALTREF) for the coding of all the other frames.

Figure 7:
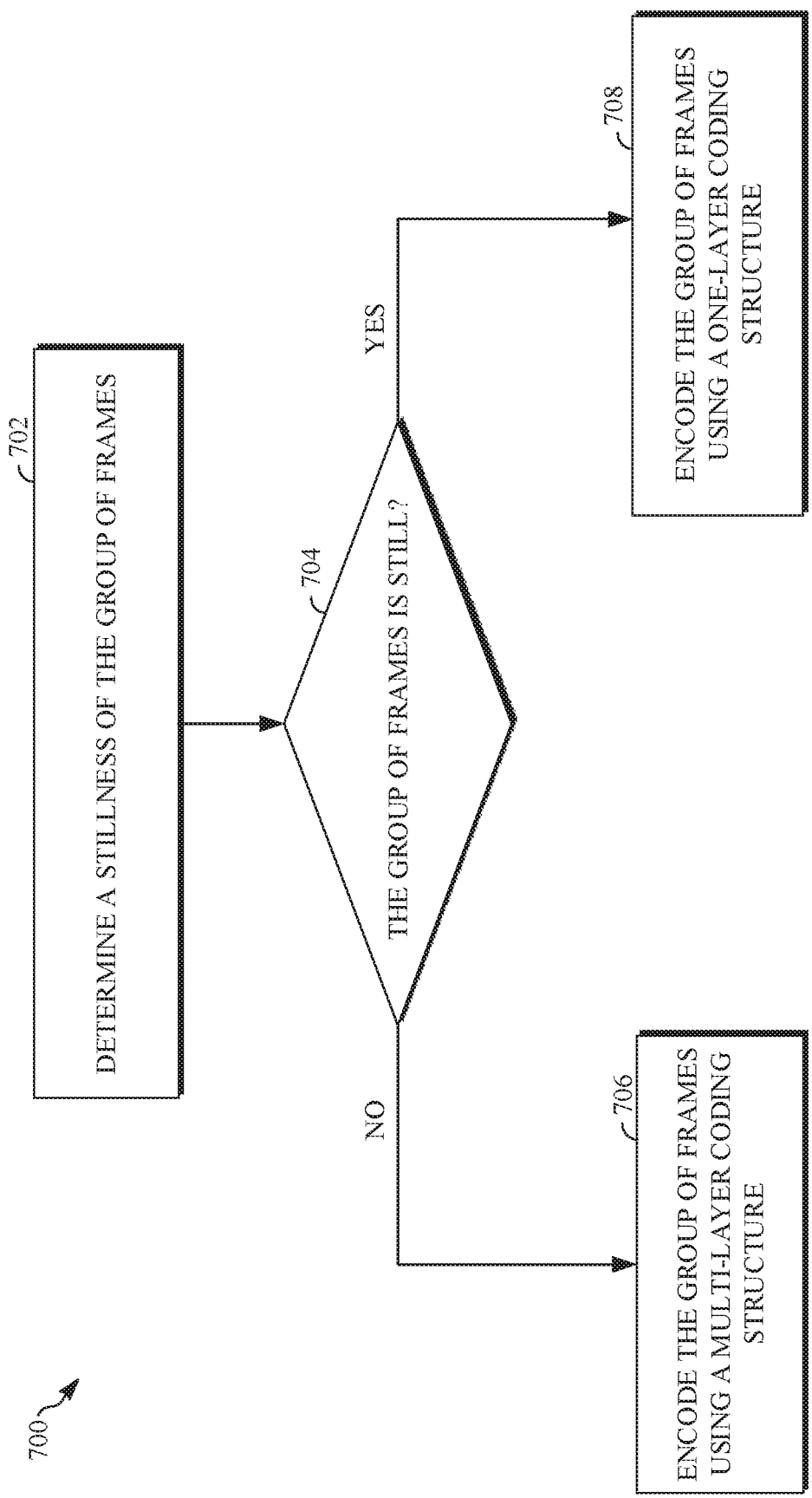
FIG. 7 is a flowchart diagram of a process for encoding a group of frames of a video sequence according to an implementation of this disclosure.

FIG. 7 is a flowchart diagram of a process 700 for encoding a group of frames of a video sequence according to an implementation of this disclosure. The process 700 determines a stillness of the group of frames. A group of frames is considered a still group when the determined stillness meets stillness conditions. If the group of frames is determined to be still, the process 700 encodes the group of frames using a one-layer coding structure. If the group is determined not to be still, the process 700 encodes the group of frames using a multi-layer coding structure.

The process 700 can be implemented, for example, as a software program that may be executed by computing devices such as transmitting station 102. For example, the software program can include machine-readable instructions that may be stored in a memory such as the memory 204 or the secondary storage 214, and that, when executed by a processor, such as CPU 202, may cause the computing device to perform the process 700. The process 700 can be implemented using specialized hardware or firmware. As explained above, some computing devices may have multiple memories or processors, and the operations described in the process 700 can be distributed using multiple processors, memories, or both. The process 700 can be implemented by an encoder, such as the encoder 400 of FIG. 4. The process 700 can be, at least partially, implemented by the intra/inter prediction stage 402 of FIG. 4.

At 702, the process 700 determines the stillness of the group of frames. In an example, the stillness of the group of frames can be determined based one or more metrics. The metrics can be extracted from the group of frames as a whole. The metrics can include a number of zero-motion blocks metric, an average per-pixel error metric, and an average raw standard deviation of the zero-motion blocks metric. Any combination of these metrics can be used to determine the stillness. The collective values of the metrics is referred to herein as the stillness of the group of frames.

In an implementation, determining the stillness of the group of frames can include coding the frames of the group of frames in a display order of the frames, collecting metrics for each of the frames of the group of frames, and using the metrics to determine the stillness.

To collect the metrics in an expedient (i.e., non-time consuming) way, the encoder can perform a simple first-pass encoding. The first-pass can be the first pass of the two-pass encoder described above and which is used to collect statistics. The statistics can be used determine the stillness metrics.

In an example of the first-pass encoding, the encoder can encode the frames of the group of frames in the display order of the frames (as opposed to some other more optimal coding structure). The first-pass encoding can include other encoding simplifications. For example, the first-pass encoding can include partitioning each frame of the group of frames into fixed-size blocks. The fixed-size blocks can be 16×16, 32×32, or another fixed size. In an implementation, the block size can be selected based on the resolution of the source video. For example, a block size of 64×64, 128×128, or larger or smaller size, can be selected for 4K video sequences. The first-pass encoding can perform only integer motion search for the fixed-size blocks. That is, the encoder does not perform sub-pixel (i.e., fractional) motion search. Sub-pixel motion refers to a motion vector that points to a location that is between pixels of blocks in the reference frame.

The number of zero-motion blocks is a measure of the number of blocks within the frames of the group of frames that use a zero motion vector. A motion vector can refer to (i.e., use) one of the reference frames of the frame buffer and describes a vertical offset and a horizontal offset in the reference frame of a collocated reference block. A zero motion vector is a motion vector that uses (0, 0) as the vertical and horizontal offsets.

In an implementation, every frame of the group of frames is partitioned into non-overlapping blocks. Motion search can be performed for the non-overlapping blocks. In motion search, a portion of a reference frame can be translated to a succession of locations (i.e., vertical and horizontal offsets) to form a prediction block that can be subtracted from a portion of a current frame to form a series of residuals. The X and Y translations corresponding to the location having the smallest residual can be selected as the motion vector. A block is considered to be a zero-motion block if the smallest residual corresponds to the (0, 0) translation.

The number of zero-motion blocks metric can be given by the percent of total zero-motion blocks of the group of frames. The number of zero-motion blocks metric can be measured in other ways. For example, the number of zero-motion blocks metric can be given by the minimum percent of zero-motion blocks per frame. That is, a percent of zero-motion blocks can be calculated for each frame of the group of frames. The minimum of all the calculated percentages can be taken as the number of zero-motion blocks metric. As such, the number of zero-motion blocks metric can be given by equation (1):

Number of zero motion blocks=
    MIN(pcnt_zero_motion$_{F_i}$|$F_i \in S$)    (1)

In equation (1), $F_i$ is a frame of the group of frames S having gf_group_interval number of frames in the group of frames. That is, S={Fi, for i=1, 2, . . . , gf_group_interval}. Gf_group_interval is the length of the group of frames S. Pcnt_zero_motion of a frame $F_i$ is the percent of inter-coded blocks of the frame $F_i$ having zero motion vectors.

The average per-pixel error metric calculates, for all the frames of the group of frames, the average per-pixel error within the group of frames. The error can be a sum of absolute differences error, a sum of square errors, or any other suitable error. The error is calculated using pixel values of a current block of a frame of the group of frames and the pixel values of the reference block (i.e., a block in a reference frame) used, during the first-pass encoding for inter-predicting the current block.

As described with respect to the number of zero-motion blocks metric, motion estimation is performed for blocks of at least some frames of the group of frames. The motion estimation results in respective predictor blocks being associated with blocks of the frames of the group of frames. The errors can be calculated between the respective predictor blocks and blocks of the frames. As such, for a frame, the calculation results in a frame error (i.e., an error for the whole frame). The frame error can be divided by the number of pixels in the frame to determine a per-pixel error for the frame.

The average per-pixel error metric can be calculated as the mean of all the per-pixel errors for all frames as given by equation (2):

$$\text{Average per pixel error} = \text{MEAN}\left(\frac{\text{Frame } Error_{F_i}}{\text{number of pixels per frame}} \middle| F_i \in S\right) \quad (2)$$

In equation (2), Frame Error$_{F_i}$ is the frame error for all pixels of all blocks of the frame $F_i$. Dividing the Frame Error$_{F_i}$ by the number of pixels in a frame provides the per-pixel error for the frame $F_i$. The average per pixel error metric can then be calculated as the mean of the per-pixel errors of all the frames of the group of frames S. As indicated above, the error calculated can be the sum of square error (SSE).

The average raw standard deviation of the zero-motion blocks metric (i.e., avg_raw_err_stdev) provides an indication of how the errors (e.g., sum of square errors) of the zero-motion blocks vary across the frames of the group of frames. The standard deviation of the zero-motion blocks can indicate that, no matter whether the block-wise errors are big or small, as long as block-wise errors are identical or similar to each other in magnitude, then the standard deviation of the zero-motion blocks would be small.

As indicated above, some blocks of a frame of the group of frames can be zero-motion blocks. For each frame, the process 700 determines the error (e.g., SSE) associated with the zero-motion blocks. That is, the process 700 determines block-wise errors of the zero-motion blocks (i.e., block_error$_{(0,0)}$). For example, if a frame is partitioned into 64 blocks and 12 of those blocks are determined to be zero-motion blocks, then the process 700 determines 12 block-wise errors. The process 700 can then determine the standard deviation of the block-wise errors. The average raw standard deviation of the zero-motion blocks is then calculated as the mean of all the standard deviations of the frames. The average raw standard deviation of the zero-motion blocks can be calculated as in equation (3):

$$\text{avg\_raw\_err\_stdev} = \text{MEAN}(\text{STDEV}_{F_i}(\text{block\_error}_{(0,0)}|F_i \in S)) \quad (3)$$

To reiterate, in calculating the average raw standard deviation of the zero-motion blocks (i.e., avg_raw_err_stdev), the process 700 considers, for a frame, only zero-motion blocks and calculates block-wise errors for the zero-motion blocks. To determine an indication of how the block-wise errors vary in a frame, the process 700 can then calculate the standard deviation of the block-wise errors of the frame. The mean value of the block-wise errors standard deviations is then calculated.

Figure 8A:
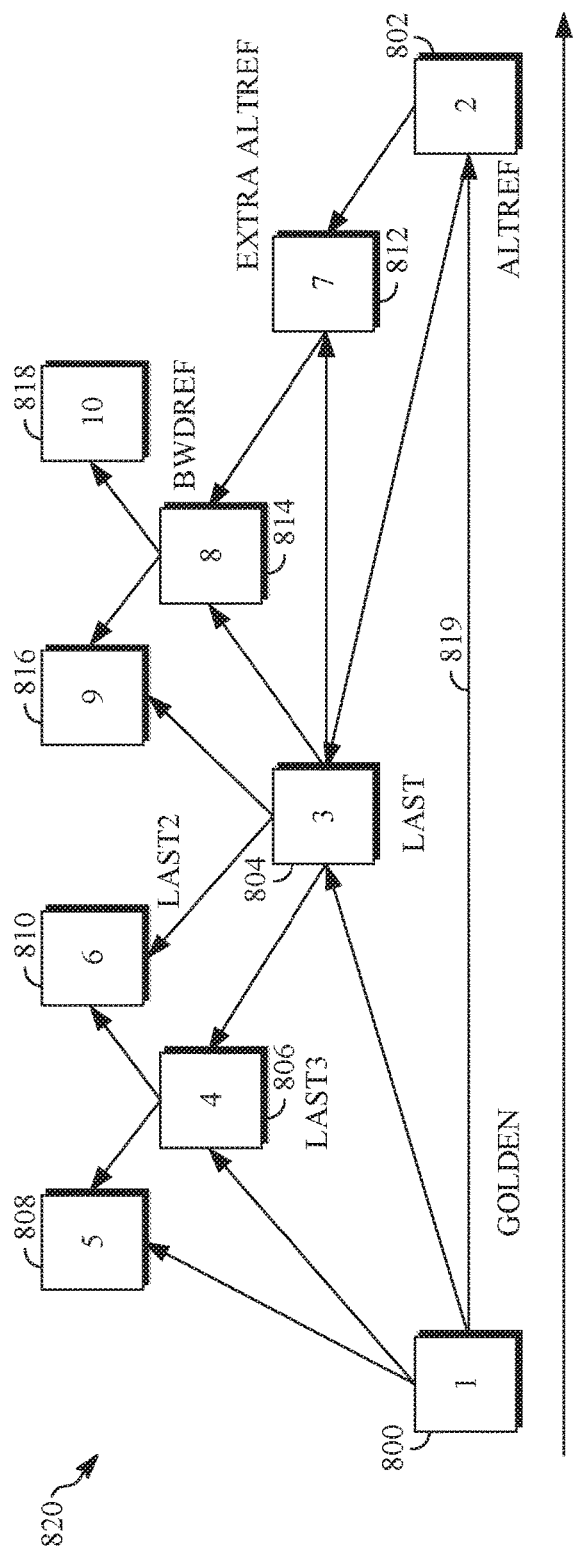
FIG. 8A is a diagram of an example of a multi-layer coding structure according to implementations of this disclosure.

At 704, the process 700 determines whether the group of frames is still or not. If the group is not still, then the process 700 proceeds to 706 to encode the group of frames using a multi-layer coding structure. FIG. 8A describes an example of a multi-level coding structure. If the group is still, then the process 700 proceeds to 708 to encode the group of frames using a one-layer coding structure. FIG. 7A describes an example of a one-layer coding structure. Said another way, in response to determining that the stillness of the group of frames meets stillness conditions, the process 700 encodes the group of frames using a one-layer coding structure, and in response to determining that the stillness of the group of frames does not meet the stillness conditions, the process 700 encodes the group of frames using a multi-layer coding structure. In an example, the stillness conditions are not met when at least one of the conditions is not met.

The process 700 can determine, whether the group of frames is still or not by comparing one or more of the calculated metrics to respective thresholds.

In an implementation, to determine whether the group of frames is a still group, the number of zero-motion blocks is compared to a zero-motion blocks threshold, the average per-pixel error being is compared to an average per-pixel error threshold, and/or the average raw standard deviation of the zero-motion blocks is compared to a standard deviation threshold. In an example, the zero-motion blocks threshold can be 90%. In an example, the average per-pixel error threshold can be 40. In an example, the standard deviation threshold can be 2000.

In an example, the group of frames is determined to be still if one, two, all, or any combination of the following conditions are met: the number of zero-motion blocks is greater than the zero-motion blocks threshold; the average per-pixel error is less than the average per-pixel error threshold; and the average raw standard deviation of the zero-motion blocks is less than the standard deviation threshold.

In an implementation, the group of frames is determined to be still if at least two of the conditions are satisfied. In another example, the group of frames is determined to be still if all the conditions are met. In yet another example, each of the metrics can have an associated weight and determining whether the group of frames is still can be based on a calculated weighted sum of the values of the metrics.

Table 1 illustrates an example of determining whether a group of frames is still. In Table 1, all the conditions must be satisfied in order to determine that the group of frames is a still group. The conditions compare the metric values to the respective threshold values.

TABLE 1

| Stillness Detection Metrics | Stillness Detection Thresholds/Conditions |
| --- | --- |
| Number of zero motion blocks | >90% |
| Average per pixel error | <40 |
| Average raw standard deviation | <2000 |

In the foregoing, the metrics are described as being calculated for all frames and all blocks. However, blocks and/or frames for which intra prediction provides better prediction than inter prediction are excluded from the calculations. For example, in cases where the first and/or last frames of group of frames use intra-prediction, the first and/or last frames are excluded from the calculation of the metrics.

For simplicity of explanation, the process 700 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

For example, the process 700 can include transmitting, in an encoded bitstream, such as the compressed bitstream 420 of FIG. 4, an indication of whether the group of frames is encoded using the multi-layer coding structure or the one-layer coding structure. For example, the indication can be a syntax element. The syntax element can be one or more bits. In an example, the syntax element can be incorporated into another syntax element.

For example, the process 700 can also include transmitting, in the encoded bitstream, the frames of the group of frames, in the coding order of the coding structure. Transmitting the group of frames in the encoded bitstream means, for example, transmitting (e.g., writing to, outputting to, etc.), in the compressed bitstream 420, the output of the stages 402-408 of encoder 400 of FIG. 4.

FIG. 8A is a diagram of an example of a multi-layer coding structure 820 according to implementations of this disclosure. The multi-layer coding structure 820 shows a coding structure of a GF group of length 10 (i.e., the group of frames includes 10 frames): frames 800-818.

An encoder, such as the encoder 400 of FIG. 4, can encode a group of frames according to the multi-layer coding structure 820. A decoder, such as the decoder 500 of FIG. 5, can decode the group of frames using the multi-layer coding structure 820. The decoder can receive an encoded bitstream, such as the compressed bitstream 420 of FIG. 5. In the encoded bitstream, the frames of the group of frames can be ordered (e.g., sequenced, stored, etc.) in the coding order of the multi-layer coding structure 820. The decoder can decode the frames in the multi-layer coding structure 820 and display them in their display order. The encoded bitstream can include syntax elements that can be used by the decoder to determine the display order.

The numbered boxes of FIG. 8A indicate the coding order of the group of frames. As such, the coding order is given by the frame order: 800, 802, 804, 806, 808, 810, 812, 814, 816, and 818. The display order of the frames of the group of frames in indicated by the left-to-right order of the frames. As such, the display order is given by the frame order: 800, 808, 806, 810, 804, 816, 814, 818, 812, and 802. That is, for example, the second frame in the display order (i.e., the frame 808) is the $5^{th}$ frame to be coded; the last frame of the group of frames (i.e., the frame 802) is the second frame to be coded.

In FIG. 8A, the first layer includes the frames 800 and 802, the second layer includes the frames 804 and 812, the third layer includes the frames 806 and 814, and the fourth layer includes the frames 808, 810, 816, and 818. The frames of a layer do not necessarily correspond to the coding order. For example, while the frame 812 (corresponding to coding order 7) is in the second layer, frame 806 (corresponding to coding order 4) of the third layer and frame 808 (corresponding to coding order 5) of the fourth layer are coded before the frame 812.

In a multi-layer coding structure, such as the multi-layer coding structure 820, the frames within a GF group may be coded out of their display order and the coded frames can be used as backward references for frames in different (i.e., higher) layers.

The coding structure of FIG. 8A is said to be a multi-layer coding structure because frames of a layer are coded using, as reference frames, only coded frames of lower layers and coded frames of the same layer. That is, at least some frames of lower layers and frames of the same layer of a current frame (i.e., a frame being encoded) can be used as reference frames for the current frame. A coded frame of the same layer as the current frame is a frame of the same layer as the current frame and is coded before the current frame. For example, the frame 812 (coding order 7) can be coded using frames of the first layer (i.e., the frames 800 and 802) and coded frames of the same layer (i.e., the frame 804). As another example, the frame 810 (coding order 6) can be coded using already coded frames of the first layer (i.e., the frames 800 and 802), already coded frames of the second layer (i.e., the frame 804), already coded frames of the third layer (i.e., the frame 806), and already coded frames of the same layer (i.e., the frame 808). Which frames are actually used to code a frame depends on the roles assigned to the frames in the reference frame buffer.

The arrows in FIG. 8 illustrate partial examples of which frames can be used, as reference frames, for coding a frame. For example, as indicated by the arrows, the frame 800 can be used to code the frame 802, the frames 800 and 802 can be used to code the frame 804, and so on. However, as already mentioned, for the sake of reducing clutter in FIG. 8, only a subset of the possible arrows is displayed. For example, as indicated above, the frames 800 and 802 can be used for coding any other frame of the group of frames; however, no arrows are illustrated, for example, between the frames 800 and/or 802 and the frames 810, 816, 818, etc.

In an implementation, the number of layers and the coding order of the frames of the group of frames can be selected by an encoder based on the length of the group of frames. For example, if the group of frames includes 10 frames, then the multi-layer coding structure of FIG. 8A can be used. In another example, if the group of frames includes nine (9) frames, then the coding order can be frames 1, 9, 8, 7, 6, 5, 4, 3, and 2. That is, for example, the $3^{rd}$ frame in the display order is the coded $8^{th}$ in the coding order. A first layer can include the $1^{st}$ and $9^{th}$ frames in the display order, a second layer can include the $5^{th}$ frame in the display order, a third layer can include the $3^{rd}$ and $7^{th}$ frames in the display order, and a fourth layer can include the $2^{nd}$, $4^{th}$, $6^{th}$, and $8^{th}$ frames in the display order.

As mentioned above, the coding order for each group of frames can differ from the display order. This allows a frame located after a current frame in the video sequence to be used as a reference frame for encoding the current frame. A decoder, such as the decoder 500, may share a common group coding structure with an encoder, such as the encoder 400. The group coding structure assigns different roles that respective frames within the group may play in the reference frame buffer (e.g., a last frame, an alternative reference frame, etc.) and defines or indicates the coding order for the frames within a group.

In a multi-layer coding structure, the first frame and last frame (in display order) are coded first. As such, the frame 800 (the first in display order) is coded first and the frame 802 (the last in display order) is coded next. The first frame of the group of frames can be referred as (i.e., has the role of) the GOLDEN frame such as described with respect to the golden frame GOLDEN 604 of FIG. 6. The last frame in the display order (e.g., the frame 802) can be referred to as (i.e., has the role of) the ALTREF frame, as described with respect to the alternative reference frame ALTREF 606 of FIG. 6.

In coding blocks of each of the frames 804-818, the frame 800 (as the golden frame) is available as a forward prediction frame and the frame 802 (as the alternative reference frame) is available as a backward reference frame. Further, the reference frame buffer, such as the reference frame buffer 600, is updated after coding each frame so as to update the identification of the reference frame, also called a last frame (e.g., LAST), which is available as a forward prediction frame in a similar manner as the frame 800. For example, when blocks of the frame 806 are being predicted (e.g., at the intra/inter prediction stage 402), the frame 808 can be designated the last frame (LAST), such as the last frame LAST 602 in the reference frame buffer 600. When blocks of the frame 808 are being predicted, the frame 806 is designated the last frame, replacing the frame 804 as the last frame in the reference frame buffer. This process continues for the prediction of the remaining frames of the group in the encoding order.

The first frame can be encoded using inter- or intra-prediction. In the case of inter-prediction, the first frame can be encoded using frames of a previous GF group. The last frame can be encoded using intra- or inter-prediction. In the case of inter-prediction, the last frame can be encoded using the first frame (e.g., the frame 800) as indicated by the arrow 819. In some implementations, the last frame can be encoded using frames of a previous GF group. All other frames (i.e., the frames 804-818) of the group of frames are encoded using encoded frames of the group of frames as described above.

The GOLDEN frame (i.e., the frame 800) can be used as a forward reference and the ALTREF (i.e., the frame 802) can be used as a backward reference for coding the frames 804-818. As every other frame of the group of frames (i.e., the frames 804-818) has available at least one past frame (e.g., the frame 800) and at least one future frame (e.g., the frame 802), it is possible to code a frame (i.e., to code at least some blocks of the frame) using one reference or two references (e.g., inter–inter compound prediction).

In a multi-layer coding structure, some of the layers can be assigned roles. For example, the second layer (i.e., the layer that includes the frames 804 and 812) can be referred to as the EXTRA ALTREF layer, and the third layer (i.e., the layer that includes the frames 806 and and 814) can be referred to as the BWDREF layer. The frames of the EXTRA ALTREF layer can be used as additional alternative prediction reference frames. The frames of the BWDREF layer can be used as additional backward prediction reference frames. If a GF group is categorized as a non-still GF group (i.e., when a multi-layer coding structure is used), BWDREF frames and EXTRA ALTREF frames can be used to improve the coding performance.

As described above, coding the group of frames using the multi-layer coding structure at 706 of FIG. 7 can include coding the first display frame (e.g., the frame 800), coding the last display frame (e.g., the frame 802), and coding a current frame of the group of frames (e.g., one of the frames 804-818) using one or two frames coded before the current frame.

Figure 8B:
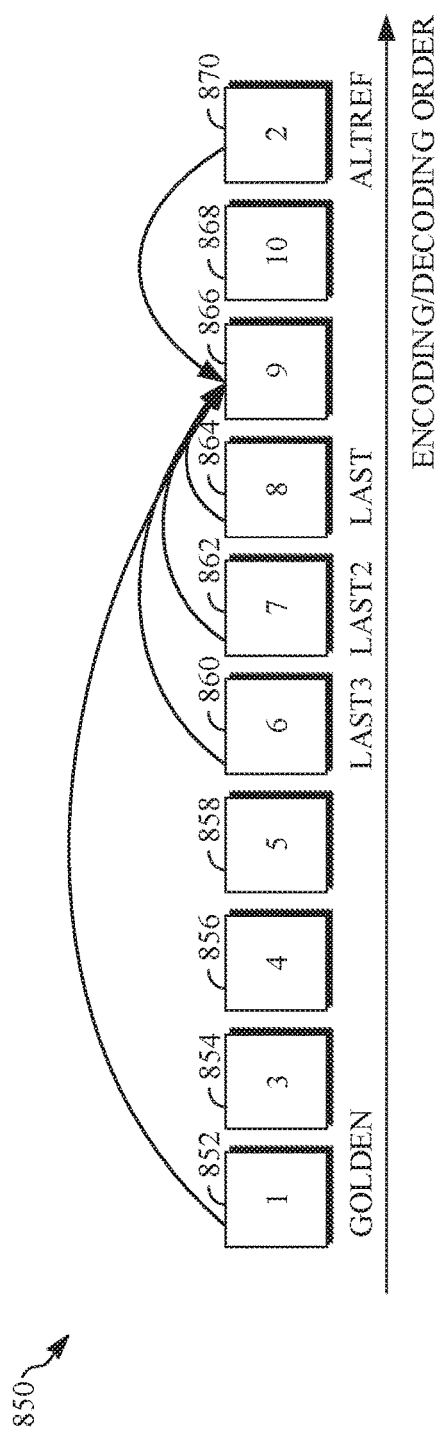
FIG. 8B is a diagram of an example of a one-layer coding structure according to implementations of this disclosure.

FIG. 8B is a diagram of an example of a one-layer coding structure 850 according to implementations of this disclosure. The one-layer coding structure 850 can be used to code a group of frames that is determined (such as at 704 of FIG. 7) to be still.

An encoder, such as the encoder 400 of FIG. 4, can encode a group of frames according to the one-layer coding structure 850. A decoder, such as the decoder 500 of FIG. 5, can decode the group of frames using the one-layer coding structure 850. The decoder can receive an encoded bitstream, such as the compressed bitstream 420 of FIG. 5. In the encoded bitstream, the frames of the group of frames can be ordered (e.g., sequenced, stored, etc.) in the coding order of the one-layer coding structure 850. The decoder can decode the frames in the one-layer coding structure 850 and display them in their display order. The encoded bitstream can include syntax elements that can be used by the decoder to determine the display order.

The display order of the group of frames of FIG. 8B is given by the left-to-right ordering of the frames. As such, the display order is 852, 854, 856, 858, 860, 862, 864, 866, 868, and 870. The numbers in the boxes indicate the coding order of the frames. As such, the coding is 852, 870, 854, 856, 858, 860, 862, 864, 866, and 868.

To code any of the frames 854, 856, 858, 860, 862, 864, 866, and 868 in the one-layer coding structure 850, except for the distant ALTREF frame (e.g., the frame 870), no other backward reference frames are used. Additionally, in the one-layer coding structure 850, the use of the BWDREF layer (as described with respect to FIG. 8A), the EXTRA ALTREF layer (as described with respect to FIG. 8A), or both is disabled. That is, no BWDREF and/or EXTRA ALTREF reference frames are available for coding any of the frames 854-868. Multiple references can be employed for the coding of the frames 854-868. Namely, the reference frames LAST, LAST2, LAST3, and GOLDEN, coupled with the use of the distant ALTREF, can be used to encode a frame. For example, the frames 852 (GOLDEN), the frame 860 (LAST3), the frame 862 (LAST2), the frame 864 (LAST), and the frame 870 (ALTREF) can be available in the reference frame buffer, such as the reference frame buffer 600, for coding the frame 866.

As such, coding the group of frames using the one-layer coding structure at 708 of FIG. 7 can include coding the first display frame (e.g., the frame 852), coding the last display frame (e.g., the frame 870), and coding a current frame of the group of frames (e.g., one of the frames 854-868) using at least one of the last display frame and a reference frame such that the reference frame is prior to the current frame in the display order.

Figure 9:
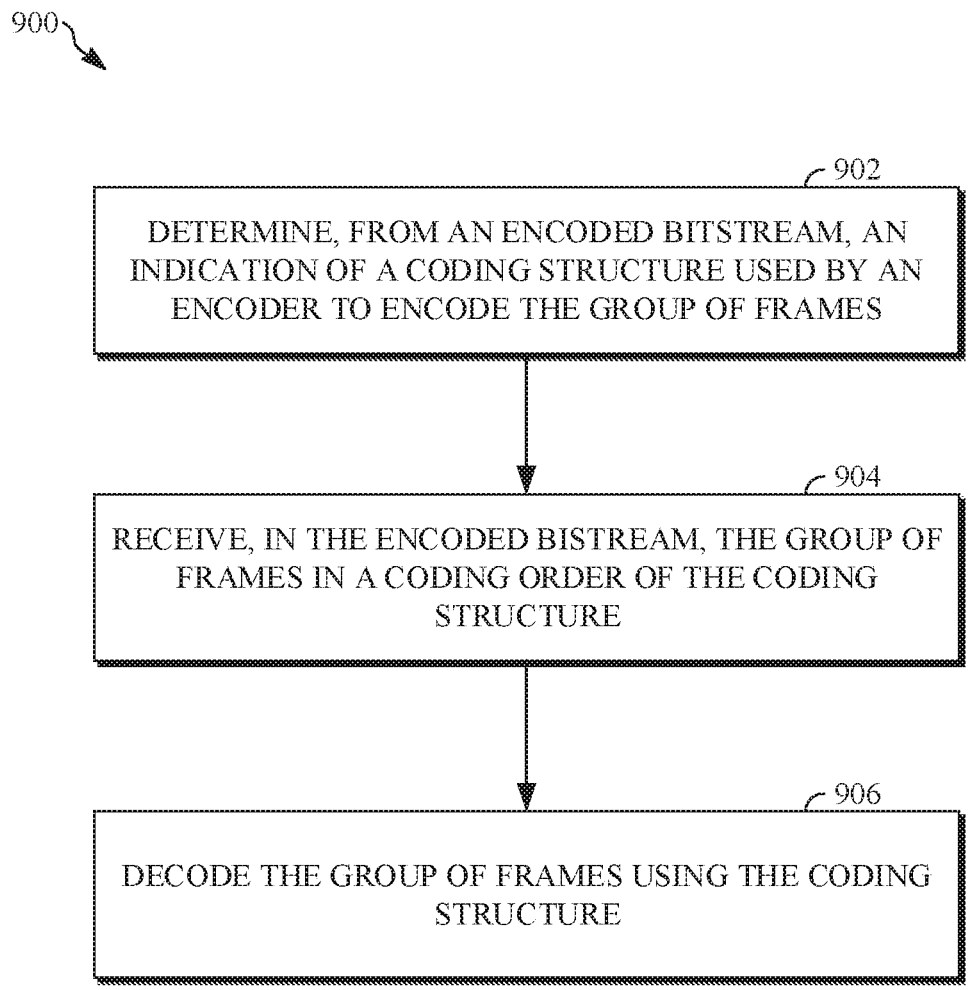
FIG. 9 is a flowchart diagram of a process for decoding a group of frames of a video sequence according to an implementation of this disclosure.

FIG. 9 is a flowchart diagram of a process 900 for decoding a group of frames of a video sequence according to an implementation of this disclosure. The process 900 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 900. The process 900 can be implemented using specialized hardware or firmware. As described above, multiple processors, memories, or both, may be used.

The process 900 can receive an encoded bitstream that includes the group of frames. The encoded bitstream can be received in any number of ways, such as by receiving the video data over a network, over a cable, or by reading the video data from a primary memory or other storage device, including a disk drive or removable media such as a CompactFlash (CF) card, Secure Digital (SD) card, or the like.

At 902, the process 900 determines, from the encoded bitstream, an indication of a coding structure used by an encoder to encode the group of frames. As used in this disclosure, "determine" means to decode, select, construct, identify, specify or other determine in any manner whatsoever. The indication can be one of a one-layer coding structure indication or a multi-layer coding structure indication. The indication can be a syntax element that indicates that the coding structure is one of a one-layer coding structure or a multi-layer coding structure. For example, the indication can be transmitted in the encoded bitstream by an encoder that encoded the group of frames using the process 700. For example, in response to determining that the group of frames is still, the encoder would have encoded the one-layer coding structure indication, and in response to determining that the group of frames is not still, the encoder would have encoded the multi-layer coding structure indication.

At 904, the process 900 receives, in the encoded bitstream, the group of frames in a coding order of the coding structure. For example, if the encoder encoded the group of frames using the multi-layer coding structure 820 of FIG. 8, then the encoder will have encoded the frames, in the encoded bitstream, in the order of the frames 800, 802, 804, 806, 808, 810, 812, 814, 816, and 818. For example, if the encoder encoded the group of frames using the one-layer coding structure 850 as described with respect to FIG. 8B, then the encoder will have encoded the frames, in the encoded bitstream, in the order of frames 852, 870, 854, 856, 858, 860, 862, 864, 866, and 868.

At 906, the process 900 decodes the group of frames using the coding structure. Decoding the group of frames can be, depending on the coding structure (i.e., the indication), as described with respect to FIG. 8A or FIG. 8B.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a group of frames of a video sequence, the method comprising:
determining a stillness of the group of frames by steps comprising:
partitioning each frame of the group of frames into respective fixed-size blocks;
performing a motion search for the respective fixed-size blocks;
collecting metrics for each of the frames of the group of frames based on the motion search; and
using the metrics to determine the stillness;
determining whether the stillness of the group of frames meets stillness conditions;
in response to determining that the stillness of the group of frames meets the stillness conditions, encoding the group of frames using a coding structure that is a one-layer coding structure; and
in response to determining that the stillness of the group of frames does not meet the stillness conditions, encoding the group of frames using the coding structure that is a multi-layer coding structure.

2. The method of claim 1, wherein
the motion search is an integer motion search.

3. The method of claim 1, wherein collecting metrics comprising:
determining a number of zero-motion blocks;
determining an average per-pixel error; and
determining an average raw standard deviation of the zero-motion blocks.

4. The method of claim 3, wherein the stillness conditions comprises at least two of:
the number of zero-motion blocks being greater than 90%;
the average per-pixel error being less than 40; and
the average raw standard deviation of the zero-motion blocks being less than 2000.

5. The method of claim 3, wherein the stillness conditions comprises:
the number of zero-motion blocks being greater than 90%;
the average per-pixel error being less than 40; and
the average raw standard deviation of the zero-motion blocks being less than 2000.

6. The method of claim 1, further comprising:
transmitting, in an encoded bitstream, an indication of whether the group of frames is encoded using the multi-layer coding structure or the one-layer coding structure.

7. The method of claim 6, further comprising:
transmitting, in the encoded bitstream, the frames of the group of frames, in a coding order of the coding structure.

8. The method of claim 1, wherein the frames of the group of frames are displayed sequentially in a display order comprising a first display frame and a last display frame, and wherein encoding the group of frames using the one-layer coding structure comprises:
encoding the first display frame;
encoding the last display frame; and
encoding a current frame of the group of frames using at least one of the last display frame and a reference frame, wherein the reference frame is a prior to the current frame in the display order.

9. The method of claim 1, wherein the frames of the group of frames are displayed sequentially in a display order comprising a first display frame and a last display frame, and wherein encoding the group of frames using the multi-layer coding structure comprises:
encoding the first display frame;
encoding the last display frame; and
encoding a current frame of the group of frames using one or two frames encoded before the current frame.

10. An apparatus for encoding a group of frames of a video sequence, the apparatus comprising:
a memory; and
a processor, wherein the memory includes instructions executable by the processor to:
determine a stillness of the group of frames by instructions to:
partition at least some frames of the group of frames into respective fixed-size blocks;
perform motion search for the respective fixed-size blocks;
collect metrics based on the motion search; and
use the metrics to determine the stillness;
in response to determining that the stillness of the group of frames meets stillness conditions, encode the group of frames using a one-layer coding structure wherein encoding using the one-layer coding structure comprises to:
encode, to obtain a first encoded frame, a first display frame in display order of the group of frames;
encode, to obtain a last encoded frame, a last display frame in the display order of the group of frames; and
encode, using as reference frames only at least one of the first encoded frame or the last encoded frame, every other frame of the group of frames; and
in response to determining that the stillness of the group of frames does not meet the stillness conditions, encode the group of frames using a multi-layer coding structure.

11. The apparatus of claim 10, wherein
the motion search is an integer motion search.

12. The apparatus of claim 10, wherein a size of the fixed-size blocks is based on a resolution of the video sequence.

13. The apparatus of claim 10, wherein the frames of the group of frames are displayed sequentially in the display order comprising the first display frame and the last display frame, and wherein to encode the group of frames using the multi-layer coding structure comprises to:
encode the first display frame;
encode the last display frame; and
encode a current frame of the group of frames using one or two frames encoded before the current frame.

14. The apparatus of claim 10, wherein to collect metrics based on the motion search comprises to:
determine a number of zero-motion blocks;
determine an average per-pixel error; and
determine an average raw standard deviation of the zero-motion blocks.

15. The apparatus of claim 14, wherein the stillness conditions comprises at least two of:
the number of zero-motion blocks being greater than a zero-motion blocks threshold;
the average per-pixel error being less than an average per-pixel error threshold; and the average raw standard deviation of the zero-motion blocks being less than a standard deviation threshold.

16. The apparatus of claim 15, wherein
the zero-motion blocks threshold is 90%,
the average per-pixel error threshold is 40, and
the standard deviation threshold is 2000.

17. The apparatus of claim 14, wherein the stillness conditions comprises:
the number of zero-motion blocks being greater than 90%;
the average per-pixel error being less than 40; and
the average raw standard deviation of the zero-motion blocks being less than 2000.

18. An apparatus for decoding a group of frames of a video sequence, the apparatus comprising:
a memory; and
a processor, wherein the memory includes instructions executable by the processor to:
determine, from an encoded bitstream, an indication of a coding structure used by an encoder to encode the group of frames,
wherein the indication is one of a one-layer coding structure indication or a multi-layer coding structure indication,
wherein the indication is determined, by the encoder, based on a stillness of the group of frames, the stillness of the group of frames being indicative of an amount of motion across the frames of the group of frames,
wherein the indication indicates at least one an order of the encoding of the frames of the group of frames or which reference frames are available for coding a frame of the group of frames, and
wherein the encoder determined the stillness of the group of frames by instructions to:
partition at least some frames of the group of frames into respective fixed-size blocks;
perform motion search for the respective fixed-size blocks;
collect metrics based on the motion search; and
use the metrics to determine the stillness;
receive, in the encoded bitstream, the group of frames in a coding order of the coding structure; and
decode the group of frames using the coding structure.

19. The apparatus of claim 18, wherein,
in response to determining that the group of frames is still, the encoder encoded the one-layer coding structure indication, and
in response to determining that the group of frames is not still, the encoder encoded the multi-layer coding structure indication.

* * * * *